Patented Sept. 11, 1923.

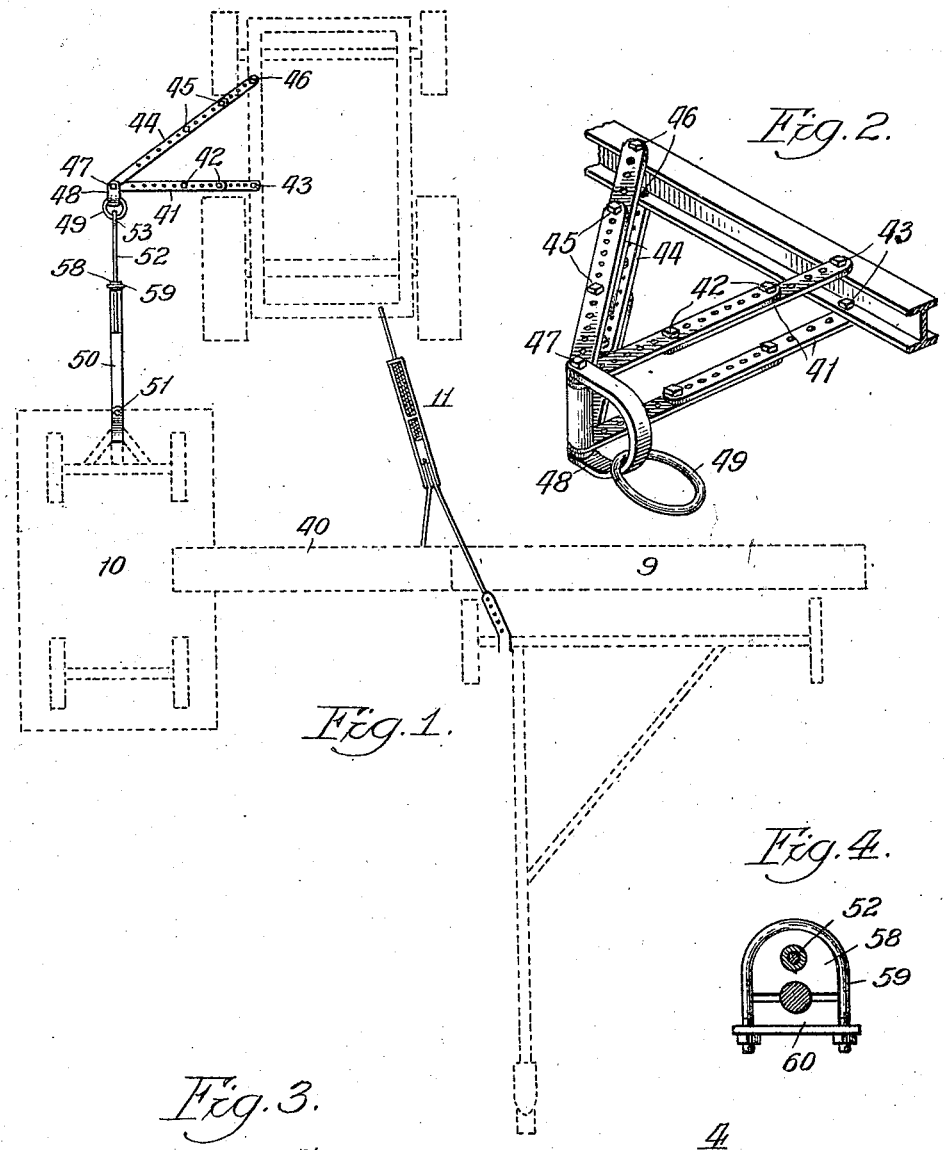

1,467,573

UNITED STATES PATENT OFFICE.

WILLIAM A. ENGELHARDT, OF OAKLEY, KANSAS.

DRAFT CONNECTION FOR TRACTORS.

Original application filed June 28, 1917, Serial No. 177,487. Divided and this application filed October 9, 1918. Serial No. 257,490.

*To all whom it may concern:*

Be it known that I, WILLIAM A. ENGELHARDT, a citizen of the United States, and a resident of Oakley, in the county of Logan and State of Kansas, have invented certain new and useful Improvements in Draft Connections for Tractors, of which the following is a full, clear, and exact description.

The invention relates to draft-connections for tractors and more particularly to those whereby a barge for receiving harvested material from the header will be drawn by the tractor, so that the barge and header will remain in cooperative relation.

The present application is a division of Serial No. 177,487 filed by me.

One object of the invention is to provide an improved hitch for drawing the barge to which the header delivers the harvested grain, which is adapted to be readily connected to the tongue used on the horse drawn barge. A further object of the invention is to provide an improved hitch of this character in which there is cushioning means both for forward pull and the back thrust. A still further object of the invention is to provide an improved connection between the draft connection and the tractor which is simple in construction and may be readily adjusted so that the barge will be kept at the desired relation with respect to the header.

The invention consists in the several novel features hereinafter set forth and more particularly defined by claims at the conclusion hereof.

In the drawings: Fig. 1 is a plan showing the improved draft-connection applied to pull a barge and showing also a draft-connection for a header. Fig. 2 is a detail perspective of a portion of the draft-connection for the barge. Fig. 3 is a detail elevation of another portion of said connection. Fig. 4 is a section taken on line 4—4 of Fig. 3.

The invention is shown as applied to a tractor drawing a header 9 and a barge 10, all of which may be of usual construction, as well understood in the art. The draft-connection 11 for the header forms the subject-matter of my aforesaid application, Serial No. 177,487 and exemplifies a means whereby a header may be drawn rearwardly and to one side of the tractor.

The improved draft device for the barge, which is drawn alongside of header to receive the harvested grain from an elevator 40, which is connected to and operated from the header, as well understood in the art, is adapted for connection to an ordinary wagon-tongue, such as is usually provided on the barge for hitching horses thereto. This draft device is connected to an adjustable bracket secured to the tractor to project laterally therefrom, to draw the barge rearwardly of and at one side of the tractor. This adjustable bracket comprises laterally projecting bars 41, each of which is made up of sections provided with holes and bolts 42 by which the length of the bar may be adjusted to bring the point of each at the desired point laterally of the tractor. The inner ends of bars 41 are secured to the frame of the tractor by bolts 43. The outer ends are secured in desired position by extensible diagonal brace bars 44, each of which is built up of perforated sections adjustably secured together by bolts 45. The front ends of brace-bars 44 are secured to the tractor frame by bolts 46 and their rear ends are secured to the outer ends of the bars 41 by the kingbolt 47 which also passes through a clevis 48 provided with a hitching ring 49.

The draft connection for the barge comprises member 50, which is adapted to overlie the wagon tongue and to be connected thereto by the pin 51 which is usually employed for connecting the double-tree to the tongue. A rod 52 having a hook 53 at its front end, which is adapted to be hooked into the ring 49, is slidably held in the bar 50, is provided with a shoulder 54 and with a stop 55 at its rear end. A spring 56 is applied to said rod to cushion the pull upon the barge through rod 52 and a spring 57 is applied to the rod to cushion the connection in backing the vehicle or when there is a rebound from the spring 56. In front of the member 50, rod 52 is slidably held in a guide-bracket 58 which is adapted to be clamped to the front end of the tongue by a U-bolt 59 and a clamping member 60. This bracket may be readily applied to any wagon tongue. The draft connection for the barge exemplifies one which is adapted to be readily applied to an ordinary wagon tongue and in which provision is made for a yielding pull upon the barge.

The invention exemplifies an improved draft connection for a barge in which the point of hitch at the side of the tractor may be varied and which is adapted to be readily applied to an ordinary wagon-tongue and in which provision is made for a yielding pull on the barge.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a draft connection for a barge, the combination of a draft bar, means for connecting the front end of the bar to a tractor, means for detachably connecting the bar to the double tree pin of the ordinary draft tongue of the barge, said bar having its front end substantially aligned with the tongue to exert a direct pull thereon, and means for securing the bar so it will be laterally rigid with the tongue.

2. In a draft connection for a barge the combination of a draft-bar composed of a pair of slidably connected front and rear members, means for connecting the front end of the front member to a tractor, means for detachably connecting the rear end of the rear member to the usual double-tree pin on the tongue of the barge, and means for detachably securing the draft bar to the tongue, forwardly of the said pin so it will be laterally rigid with the tongue.

3. In a draft connection for a barge, the combination of a draft-bar composed of longitudinally extending slidably connected front and rear members, means for connecting the front end of the front members to a tractor, means for detachably connecting the rear member to the ordinary tongue of the barge, means to secure the bar so it will be laterally rigid with the tongue, and means between the members to cushion the pull or back thrust from the tractor.

4. In a draft connection for a barge, the combination of a draft-bar composed of slidably connected members, a spring relatively disposed between said members, means for connecting the front end of one member to a tractor, and means for detachably securing the bar to the draft-tongue of a barge, comprising a bracket removably clamped to the tongue.

WILLIAM A. ENGELHARDT.